United States Patent [19]

Harada et al.

[11] Patent Number: 4,667,586
[45] Date of Patent: May 26, 1987

[54] BEVERAGE BREWING APPARATUS FOR A VENDING MACHINE

[75] Inventors: Tsutomu Harada, Takasaki; Toshifumi Takahashi, Isesaki, both of Japan

[73] Assignee: Sanden Corporation, Gunma, Japan

[21] Appl. No.: 802,333

[22] Filed: Nov. 26, 1985

[30] Foreign Application Priority Data

Dec. 4, 1984 [JP] Japan .......................... 59-183139[U]

[51] Int. Cl.$^4$ ............................................. A47J 31/00
[52] U.S. Cl. ................................... 99/289 R; 474/113
[58] Field of Search ............. 99/289 R, 289 D, 289 P, 99/279, 287; 426/433; 474/101, 113, 114

[56] References Cited

U.S. PATENT DOCUMENTS

| | | | |
|---|---|---|---|
| 3,292,526 | 12/1966 | Heier | 99/289 R |
| 3,349,690 | 10/1967 | Heier | 99/283 |
| 3,496,861 | 2/1970 | Stahler | 99/289 R |
| 4,271,753 | 6/1981 | Neely | 99/289 R |
| 4,389,924 | 6/1983 | Hoesselbarth | 99/289 R |

Primary Examiner—Robert W. Jenkins
Attorney, Agent, or Firm—Banner, Birch, McKie & Beckett

[57] ABSTRACT

Beverage brewing apparatus suitable for use in a vending machine has a frame supporting a vertically movable open bottom cylinder and a piston slidably disposed within the cylinder. A brewing cavity is disposed beneath the cylinder to enable reciprocation horizontally between a brewing position and a rest position. The horizontal movement of the cavity is controlled through a cable running around a pulley rotatably supported on the frame. The pulley is provided with a mechanism for adjusting the position thereof to determine the brewing position and rest position of the cavity to ensure secure engagement between the cylinder and brewing cavity.

5 Claims, 7 Drawing Figures

BEVERAGE BREWING APPARATUS FOR A VENDING MACHINE

BACKGROUND OF THE INVENTION

This invention relates to a beverage apparatus suitable for use in a beverage vending machine, and more particularly, to improvement of the sealing situation between the brewing cylinder and brewing cavity during the extracting operation of the apparatus.

Beverage brewing apparatus suitable for use in vending machines for preparing single cup quantities of beverages from beverage material is well known in the prior art. For example, U.S. Pat. No. 3,349,690 issued to William Heier discloses one construction for such a brewing apparatus.

Referring to FIG. 1 on the application drawings, the basic construction and brewing cycle of a prior art apparatus will be described. Frame 1 of the apparatus supports a vertically movable open-bottom cylinder 2 which has the bottom opening covered by a filter member 3. A vertically movable piston 4 is disposed within cylinder 2 and relative movement between cylinder 2 and piston 4 is created by operation of a cam member 5 driven by motor 6. One end opening of a duct 7 is connected with a water tank (not shown) through electromagnetic valve 9, this end opening being closely placed above the upper opening of cylinder 2 to supply hot water into cylinder 2. A brewing cavity 10, which is generally reciprocable horizontally to a brewing position (this position being shown by solid lines in FIG. 1), is placed beneath the cylinder 2 and sealed with the lower portion of cylinder 2 in the brewing position.

In this apparatus, brewing cavity 10, at the start of a brewing cycle initiated by a coin operated switch for example, moves horizontally toward the brewing position from the rest position to be placed beneath the bottom opening of cylinder 2. During this horizontal movement, ground coffee is supplied into the brewing cavity 10 through coffee hopper 11 at a supply position (this position being indicated by dotted lines in FIG. 1). When brewing cavity 10 is properly aligned beneath the cylinder 2, due to the operation of cam member 5, cylinder 2 moves downwardly into tight engagement with cavity 10. This forms a chamber which is filled with hot water supplied through duct 7.

Thereafter, piston 4 moves downwardly to force the water through the filter member 3 into the ground coffee in cavity 10 and through an outlet conduct 13 to a cup 14 placed at a dispensing station. Before introducing coffee into the cup, the extracted coffee would be mixed with a suitable amount of sugar and/or cream, both of which are supplied from canisters 15 and 16, respectively. Thereafter, the brewing cavity 10 containing the spent coffee grounds is moved to its rest position. The grounds in the brewing cavity 10 are discarded at a position which is disposed just before the rest position is reached. When the brewing cavity 10 is returned to its rest position, one brewing cycle has been completed.

In the above described apparatus, brewing cavity 10 is normally moved by operation of cam member 5 acting through a cable, and engagement between cylinder 2 and brewing cavity 10 is done in the following manner:

(1) Initially, the brewing cavity is moved over to be beneath the position of cylinder 2, and thus put in its predetermined brewing position;
(2) during the above mentioned motion of the cavity cylinder 2 is moved downwardly and before engaging with the cavity, a pair of pins formed on the lower end surface of cylinder 2 engage with the outer peripheral edge of cavity 10;
(3) then, the relationship between the cylinder and cavity is determined by engagement of the pins and cavity and tight sealing between the cylinder and cavity is secured.

However, the required relative movement between the cavity and the cylinder is a critical operation. Since the range of engagement between the pins and the cavity is very limited if the movement of either one of the cavity or cylinder goes wrong which may be caused by dimensional error or timing change, the precise engagement between the cylinder and cavity is destroyed. Thus, the sealing between the cylinder and cavity is improper. Also, even if the engagement between the cylinder and cavity is previously set at the initial state, the engagement position may become offset from its intended predetermined position by increasing length of the operating cable caused by long time usage of the apparatus.

SUMMARY OF THE INVENTION

It is a primary object of this invention to provide an improved beverage brewing apparatus which accomplishes favorable brewing operations while having a simple construction.

It is another object of this invention to provide a beverage brewing apparatus which is provided with a position adjusting means for determining the brewing position and rest position of a brewing cavity at any time through a cavity movement means which is also used to secure engagement between the cylinder and cavity.

It is still another object of this invention to provide a beverage brewing position capable of easily replacing existing apparatus by simple modification of the existing apparatus.

Beverage brewing apparatus according to this invention includes a frame and vertically movable brewing liquid cylinder which is supported by the frame, this cylinder having an open top and an open bottom. A piston member is reciprocally disposed within the cylinder. A brewing liquid supply means which has a discharge opening positioned to discharge brewing liquid into the open top of the cylinder is connected to a liquid heating tank in which a brewing liquid is stored. A brewing cavity is disposed beneath the cylinder to be horizontally reciprocable between a brewing position and a rest position. Ground beverage material is supplied into the brewing cavity through a ground material supply means. A cam member which is rotated by a motor controls the relative movement between the cylinder and piston, and also determines the timing of supply of liquid and beverage material. The movement of the brewing cavity is also controlled by the cam member through a cable passing around a pulley. The pulley for the cable has an adjusting mechanism to initially determine, and thereafter adjust as may be needed, the brewing position and rest position of the brewing cavity.

Further objects, features and other aspects of this invention will be understood from the detailed descrip-

DETAILED DESCRIPTION OF THE PREFERRED EMBODIMENTS

Figure 1:
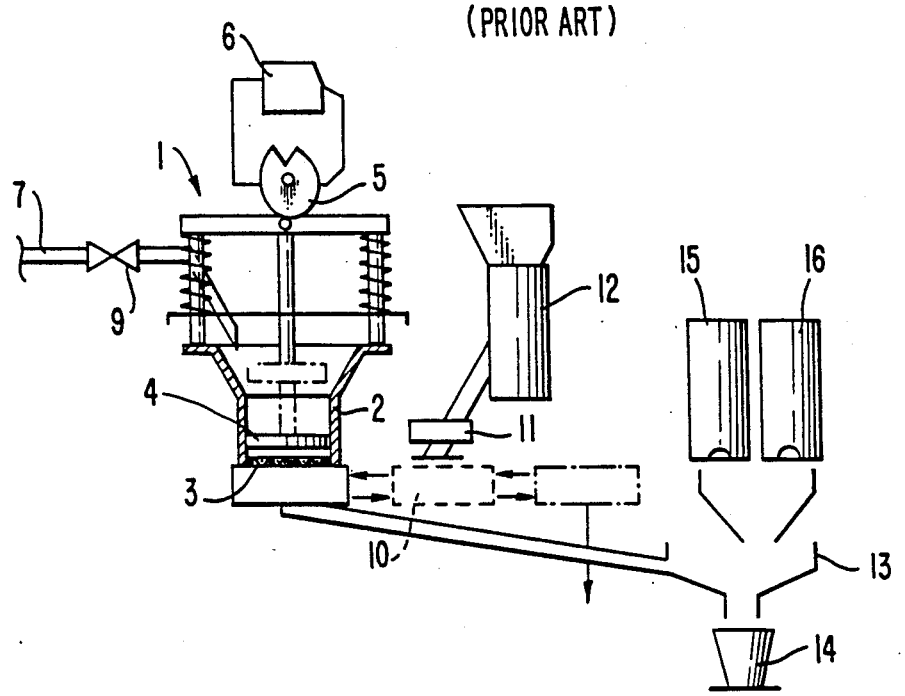
FIG. 1 is a diagrammatic view of a prior art brewing apparatus to illustrate the basic construction and brewing cycle.
Figure 4:
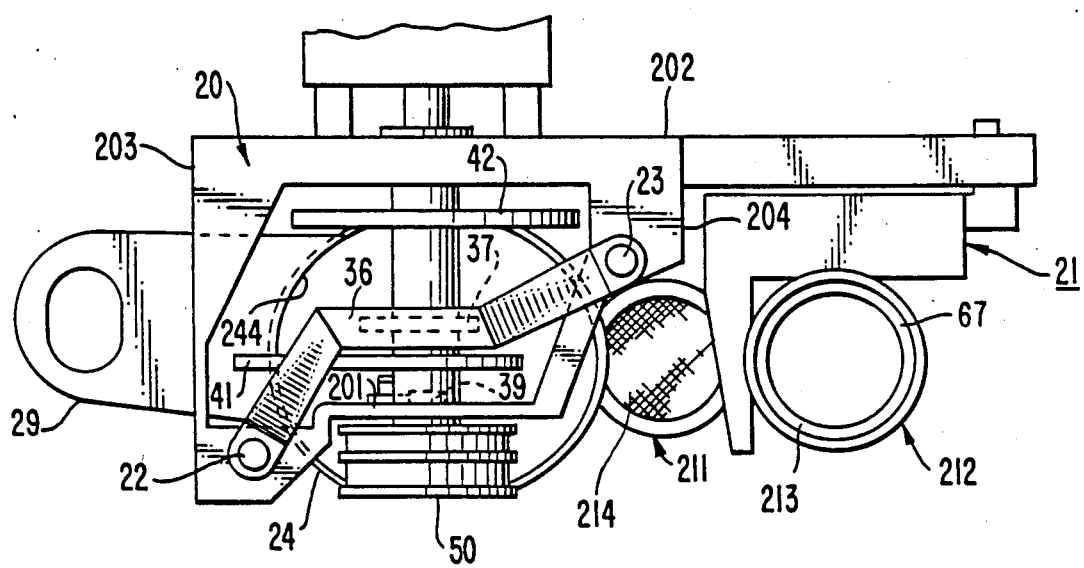
FIG. 4 is a plan view of the beverage brewing apparatus of FIG. 2.
Figure 2:
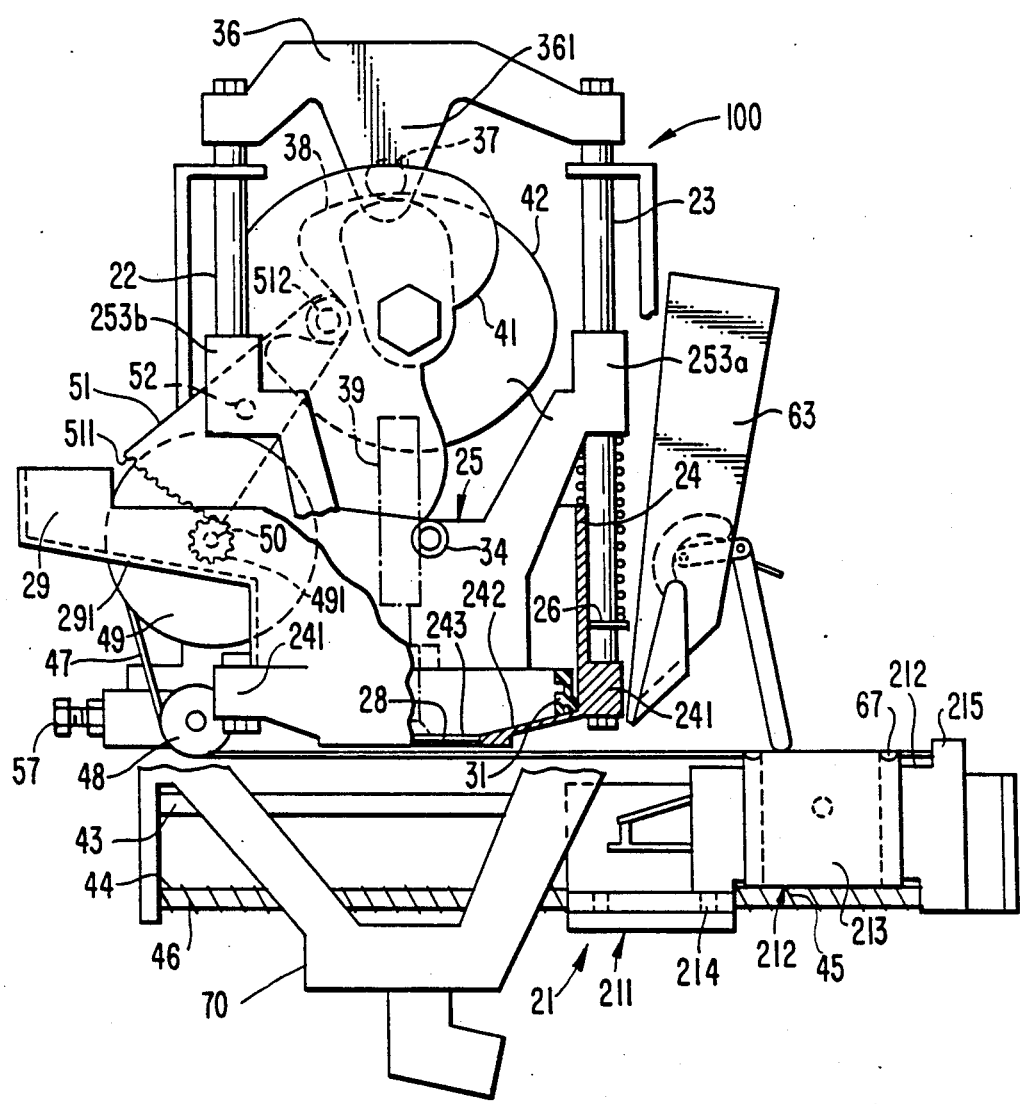
FIG. 2 is a front view with parts in section of a beverage brewing apparatus according to one embodiment of this invention.
Figure 3:
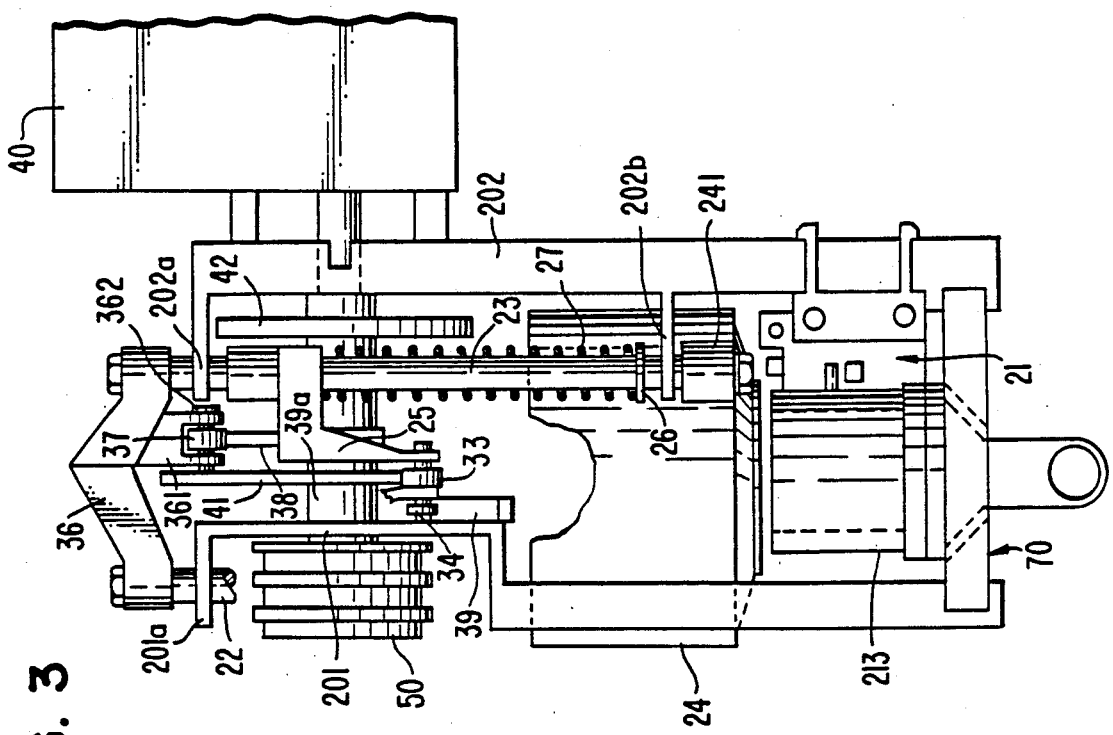
FIG. 3 is a partly cutaway side view of the beverage brewing apparatus of FIG. 2.

Referring to FIGS. 2-4, a beverage brewing apparatus 100 in accordance with the present invention is shown. The brewing apparatus 100 includes a frame body 20 defined by a front wall 201, rear wall 202 and side walls 203 and 204. Rear wall 202 provides a base portion 21 including a filter supporting carriage 211 and brewing cavity carriage 212 to be described hereinafter.

A front guide rod 22 is mounted on front wall 201 and a rear guide rod 23 is supported on rear wall 202. Guide rods 22 and 23 are generally diagonally opposite one another within the frame body 20 and support a brewing cylinder 24 and piston 25 to be described hereinafter.

Brewing cylinder 24 has a pair of supporting portions 241 projecting from an outer peripheral surface thereof. Each of rods 22 and 23 extends vertically and is fixed to one of the supporting portions 241. Rod 23 is supported by a corresponding bearing support 201a on front wall 201. A snap ring 26 is fitted on each of guide rods 22 and 23, located above supporting portions 241 and a spring 27 surrounds each of rods 22 and 23 at a location above snap ring 26. Thus, cylinder 24 is fixed to and movable with rods 22 and 23.

As clearly shown in FIG. 2, cylinder 24 has a top opening and lower opening 243, and also has a sloped bottom 242 which extends to reduced diameter lower opening 243 and is coaxial therewith. The lower opening 243 is covered by a fine mesh screen 28 which is removably disposed within opening 243. This screen 28 prevents coffee grounds or other extract material from entering into cylinder 24 together with the hot water while the brewing operation is in progress.

Figure 5:
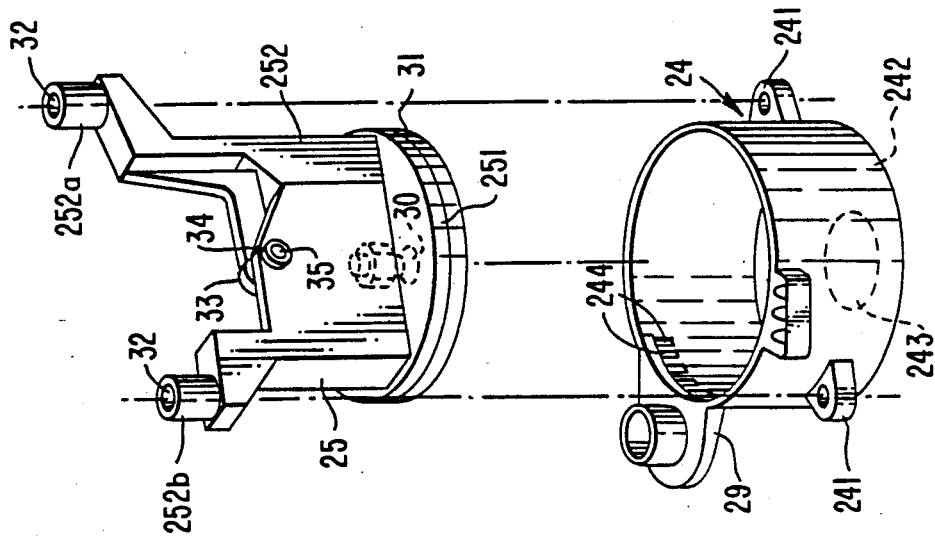
FIG. 5 is a diagrammatic exploded perspective view of the cylinder and piston of the apparatus of FIG. 2.

Cylinder 24 is provided with a series of inlet ports 244 (FIG. 5) at its upper inner periphery and a chute 29 extends from the outer peripheral surface of cylinder 24 communicating with the interior through the inlet ports 244. Chute 29 has a sloping bottom wall 291 which communicates with inlet ports 244 so that hot water may be introduced through chute 29 at a location below piston 25 when piston 25 is in its uppermost position.

Piston 25, which remains at all times within cylinder 24, comprises a lower circular plate portion 251 (FIG. 5) and an upper U-shaped bridge portion 252. Portions 251 and 252 are connected with one another by a bolt-nut arrangement 30. A seal element 31 is placed on the outer peripheral surface of lower portion 251 to effect sealing between cylinder 24 and piston 25. Each of the ends 252a and 252b of bridge portion 252 is formed with a bore hole 32 through which one of rods 22 and 23 extends. The upper ends of springs 27 which are disposed to surround rods 22 and 23, respectively, are contacted with the undersides of the ends 252a and 252b of bridge 252. Springs 27 thereby apply a force between snap rings 26 and ends 252a and 252b of bridge 252 to thereby bias piston 25 upwardly.

A cam follower 33 and centering roller 34 are rotatably supported on bridge 252 through a shaft 35 disposed to extend through bridge 252 constitute a pair of bearing guides working as a three point suspension in conjunction with seal element 31 on piston 25.

A guide element 39 is mounted on an inner surface of front wall 201 facing centering roller 34 to accommodate rolling motion of roller 34 along guide element 39. Therefore, straight downward movement of piston member 25 is maintained by the rolling motion of centering roller 34 along one side surface of guide element 39.

A cylinder operating bridge 35 has its ends secured to the upper ends of rods 22 and 23, respectively. The arrangement is such that with cylinder 24 being fixed on the lower ends of rods 22 and 23, and cylinder operating bridge 36 being fixed on the upper ends of rods 22 and 23 there is provided a positive fixed mounting system for ensuring smooth upward and downward movement of vertical arm 361 extending downwardly from bridge 36. Arm 361 of bridge 36 is provided with a slot in its lower end which rotatably supports a cam follower 37 on a support shaft 362 on arm 361. Cam follower 37 cooperates with a cam 38.

A cam shaft 39a extends between front and rear walls 201 and 202. Rear wall 202 has a hole through which one end of cam shaft 39a extends. This end of cam shaft 39a is connected with a motor device 40. Three cams including; a first cam 41 acting as the piston cam cooperating with piston cam follower 33; a second cam 38 cooperating with bridge cam follower 37 and; a third cam 42 are secured to cam shaft 39a, spaced therealong as shown in FIG. 3.

Base portion 21 includes upper and lower rods 43 and 44 as shown in FIG. 2. Brewing cavity carriage 212 which supports brewing cavity 213 is slidably supported on rods 43 and 44. Filter support carriage 211 in which filter 214 is removably disposed is also slidably supported on rods 43 and 44. Brewing cavity 213 has a groove formed in its upper surface to retain a seal element 67 that assures sealing between the lowermost surface of cylinder 24 and brewing cavity 213.

One of the rods 43 and 44, such as lower rod 44 is provided with a right spring 45 and a left spring 46. The springs 45 and 46 are coaxial with respect to rod 44 and are separated from one another by a portion of filter support carriage 211. The right hand end of spring 45 abuts against brewing cavity cariage 212. The left hand end of spring 46, which has a stronger recoil strength than the right spring 45, abuts against a side wall of base portion 21.

Figure 6:
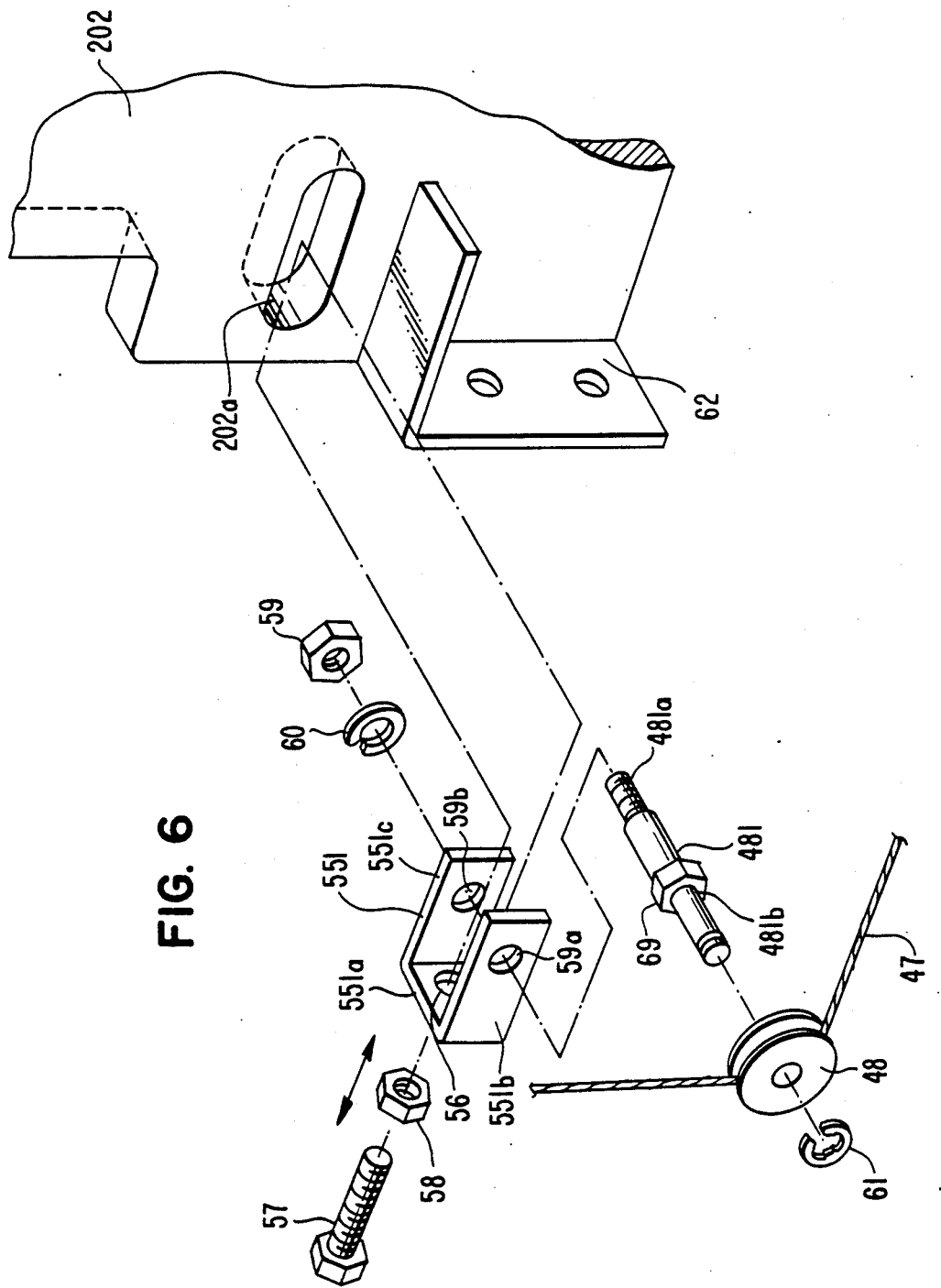
FIG. 6 is an exploded perspective view of a position adjusting mechanism for a pulley used in the apparatus of FIG. 2.

Cable 47 has one end removably secured to a projection 215 on the upper surface of brewing cavity 213. Cable 47 extends generally parallel to rods 43 and 44, and around a pulley 48 rotatably supported by rear wall 202 through shaft 481 (FIG. 6). From pulley 48, cable 47 extends upwardly around a spool 49. Spool 49 is mounted on a shaft 50 which is provided with a pinion 491 fixedly secured with spool 49. A gear segment 51 which has teeth 511 to mesh with the teeth on pinion 491 is pivotably supported on a shaft 52. At the end of segment 51 remote from teeth 511, there is provided a cam follower 512 which cooperates with third cam 42. The teeth 511 form an arc which is approximately 45° of a full circle.

As shown on FIG. 6, the brewing apparatus is also provided with a minor adjusting mechanism 55 to determine the positioning of cable pulley 48 which will be described more clearly hereinafter.

Referring to FIG. 6, a generally rectangular-shaped hole 202a is formed through rear wall 202 to receive shaft 481 of cable pulley 48. Pulley adjusting mechanism 55 includes a U-shaped metal fitting 551 which is slidably disposed on the side edge of rear wall 202 thereby placing rear wall 202 into the gap between the legs 551b and 551c of U-shaped fitting 551. A threaded hole 56 is formed through base portion 551a of fitting 551. A screw 57 screws into hole 56 and engages against the side edge surface of rear wall 202. The amount of screwing of screw 57 within hole 56 is limited by a nut 58 threaded onto screw 57.

Holes 59a and 59b are formed through the outer end portion of each of the legs 551b and 551c of fitting 551 to be aligned with rectangular hole 202a. The shaft 481 of cable pulley 48 which is a stepped shaft is inserted through the holes 59a and 59b of fitting 551 and rectangular hole 202a of rear wall 202. The rear terminal end of shaft 481 is provided with a threaded portion 481a for screwing on a nut 59 and washer 60. A step nut 69 disposed on the mid portion of shaft 481 prevents shaft 481 from passing through hole 59a while nut 59 holds shaft 481 in place from the other side of leg 551c. The front end portion of shaft 481 rotatably supports cable pulley 48 which is disposed between step portion 481b and a snap ring 61 affixed on the outer end of shaft 481.

In this construction of pulley adjusting mechanism 55, fitting 551 is able to undergo sliding motion along the end surface of rear wall 202 due to the screwing operation of screw 57. Following the operation of screw 57, shaft 481 of cable pulley 48 is guided along the rectangular shaped hole 202a together with movement of fitting 551. Therefore, the position of pulley 48 is determined by the operation of screw 57. The horizontal movement of fitting 551 is stabilized by a guide element 62 affixed on the inner surface of rear wall 202.

In the above described beverage brewing apparatus, upon initiation of an electrical input which may in response to introducing a coin into a dispensing mechanism, motor 40 turns cam shaft 39a clockwise as seen in FIG. 2.

Upon the rotation of cam shaft 39a, brewing cavity carriage 212 moves horizontally toward the left side in FIG. 2 through operation of third cam 42 engaging with cam follower 512. Cam follower 512 engaging the third cam 42 moves gear segment 51 counter clockwise due to clockwise rotation of cam 42 until follower 512 passes an inclined portion on cam 42. Therefore spool 49 is rotated by rotation of pinion 491 engaging with the teeth 511 on segment 51. Cable 47 is thereby wound up by rotation of spool 47. Thus, brewing cavity carriage 212 moves to the left side against the recoil strength of left spring 46. During the horizontal movement of the brewing cavity carriage 212, the brewing cavity 213 becomes disposed above filter support carriage 211, and at this time, a predetermined amount of ground coffee is supplied into brewing cavity 213 through coffee hopper 63.

After brewing cavity 213 receives the ground coffee, brewing cavity 213 continues to move toward the left side together with filter supporting carriage 211. As cam follower 512 of segment 51 passes the edge of the inclined portion on cam 42, brewing cavity 213 passes into a position beneath cylinder 24 to be aligned at the brewing position beneath cylinder 24.

On the other hand, following the movement of cam shaft 39a, cylinder 24 moves downwardly into tight engagement with cavity 213 due to movement of second cam 38. Before engagement between cavity 213 and cylinder 24, a pair projections (not shown) formed on the lower end surface of cylinder 24 engage against the outer peripheral edge of cavity 213. Then the alignment of cylinder 24 and cavity 213 becomes determined and precise engagement between cylinder 24 and cavity 213 is realized. The tight sealing between cylinder 24 and brewing cavity 213 is secured by seal element 67 disposed on the upper surface of brewing cavity 213.

As cam shaft 39a continue to rotate, a predetermined amount of hot water is supplied into cylinder 24 through chute 29. The timing for supply of the gound coffee into brewing cavity 213 and hot water into cylinder 24 is controlled by the rotation of a pulley (not shown) fixed on the front end of cam shaft 39a extending from front wall 201. Cam shaft 39a continues rotating clockwise with piston follower 33 riding in a dwell section on piston cam 41 and also cam follower 512 of segment 51 riding in a dwell section on third cam 42. Therefore, in this situation, cylinder 24 and cavity 213 are fixedly positioned at the predetermined brewing position.

As piston cam 41 rotates, piston 25 moves downwardly and during this downward movement of piston 25, the ends 252a and 252b of U-shaped bridge 252 compress spring 27 surrounding guide rods 22 and 23 to ensure sealing of seal element 67 disposed on brewing cavity 213 with a seal element (not shown) placed between the lowermost opening of brewing cavity 213 and filter 214. During the brewing operation, springs 27 are continuously compressed by the downward movement of U-shaped bridge 252 to ensure sealing between cylinder 24 and cavity 213, and between cavity 213 and filter 24. After piston 24 has passed water inlet ports 244 on the upper inner wall surface of cylinder 24, a layer of sealed air is trapped between the top of the hot water surface and bottom surface of piston 25.

When piston 25 reaches a lowered position whereat all of the hot water has been forced through the ground coffee into brewing cavity 213, piston 25 continues downwardly at a slightly increased speed to force hot air through the spent ground coffee. Just prior to the end of its downward stroke, piston 25 approaches zero downward acceleration. The hot air passed through the spent ground coffee tends to dry out the ground coffee, thereby rendering it to a dry enough state so that it may be easily discharged. The extracted beverage is supplied to a cup (not shown) through funnel 70 which is disposed between the front and rear walls 201 and 202.

When piston 25 reaches the end of its downward stroke, cylinder 24 and piston 25 are moved slightly upward to clear the top flange on brewing cavity 213. At this time, cam follower 512 of segment 51 enters the valley in third cam 42. This commences the release of cable 47 wound on spool 49. Since cable 47 is connected with brewing cavity 213 and limited the rightward motion of both brewing cavity carriage 212 and filter support carriage 211, when cable 47 is released, brewing cavity carriage 212 is urged toward the right side in FIG. 2 due to the recoil strength of left spring 46.

During the above mentioned operation, when the filter support carriage 211 reaches a predetermined position, movement of filter support carriage 211 is stopped, but brewing cavity carriage 212 continues its rightward movement. The spent ground coffee is discarded from brewing cavity 213 before reaching the rest position where one brewing cycle has been completed.

Figure 7:
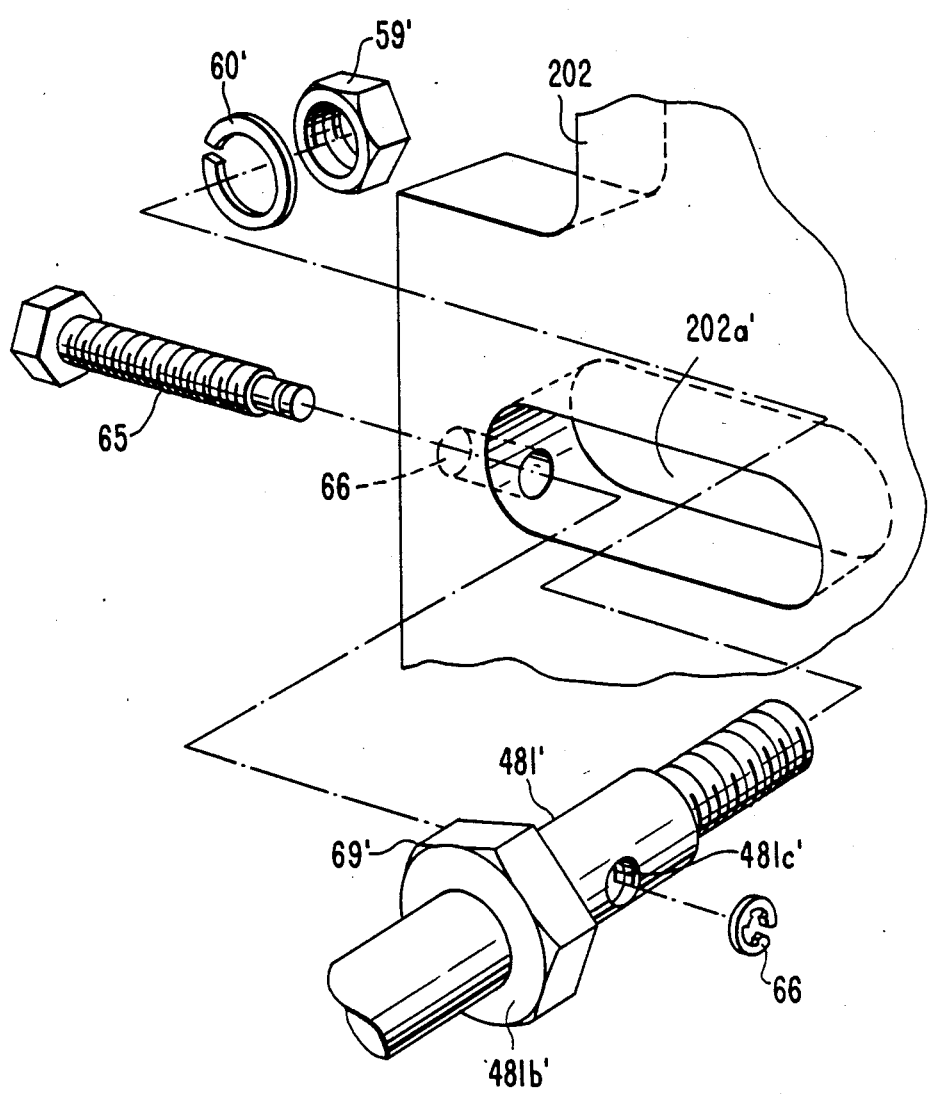
FIG. 7 is an exploded perspective view of a position adjusting mechanism according to another embodiment of this invention.

Referring to FIG. 7, another embodiment of this invention is shown. The pulley adjusting mechanism 55' comprises only a generally, rectangular-shaped hole 202a' formed through rear wall 202 and bolt 65 screwed into a threaded hole 66 formed on the side edge portion of rear wall 202 to extend the outer end of bolt 65 into the interior of hole 202a'. Stepped shaft 481' is formed with a threaded hole 481c' to engage with the outer end of bolt 65. Disengagement between bolt 65 and shaft 481' is prevented by a snap ring 66 disposed on the outer end of bolt 65. Thus the position of shaft 481' within rectangular-shaped hole 202a', i.e., placement of cable pulley 48, is determined by the amount of threading bolt 65 into the threaded hole 481c' of shaft 481'. Separation of shaft 481' from rectangular-shaped hole 202a' is prevented by a nut 59' screwed on the outer end portion of shaft 481' with a washer 60'. A step nut 69 is disposed on the mid portion of shaft 481'. Nut 59' and step nut 69' are disposed on opposite sides of rear wall 202' from each other.

As mentioned above, the pulley 48 to which cable 47 is attached is provided with a position adjusting mechanism for enabling the pulley to be slightly moved along the frame. Therefore, the brewing position and rest position of the brewing cavity is determined by the positioning of the pulley and this position determining operation may be easily operated at any time. Therefore, alignment between the cylinder and the brewing cavity is assured to accomplish effective sealing between the cylinder and brewing cavity.

This invention has been described in detail in connection with the preferred embodiments, but these embodiments are examples only and this invention is not to be considered as restricted thereto. It will be easily understood by those skilled in the art that other variations and modifications can be easily mode within the scope of this invention as claimed.

We claim:

1. In a beverage brewing apparatus comprising a frame, a vertically movable cylinder member supported on said frame, said cylinder member having an open top and an open bottom, a vertically movable piston member disposed within said cylinder and supported on said frame, means for supplying hot water into said cylinder below the elevation of said piston, a base assembly including a brewing cavity disposed beneath said cylinder member, said brewing cavity being mounted to be movable horizontally between a brewing position and a rest position and be sealed with said cylinder member in said brewing position, a motor drive camshaft, a plurality of cams on said camshaft and a plurality of cam followers engaging said cams to control the movement of said piston and cylinder, and horizontal movement of said brewing cavity being controlled by one of said cams and cam followers through a cable extending around on a pulley, said pulley being rotatably mounted on said frame, the improvement comprising mechanism provided in the mounting of said pulley for adjusting the position of said pulley to initially determine the brewing position and rest position of said brewing cavity.

2. The beverage brewing apparatus of claim 1 wherein said mechanism for adjusting the position of said pulley comprises a generally rectangular shaped hole formed through said frame, a U-shaped fitting horizontally slidably disposed on said frame and having aligned holes at the outer end portions of both legs of said fitting and a threaded aperture in the base portion of said fitting, a bolt screwed into said threaded aperture to determine the position of said fitting relative to said frame, and a shaft rotatably supporting said pulley extending through said holes of said fitting and said frame.

3. The beverage brewing apparatus of claim 2 wherein the horizontal movement of said fitting is assured by a guide element mounted on said frame.

4. The beverage brewing apparatus of claim 1 wherein said mechanism for adjusting the position of said pulley comprises a generally rectangular-shaped hole formed through said frame, a bolt screwed into a threaded hole formed on the exterior of said frame to extend into said rectangular-shaped hole, and a shaft rotatably supporting said pulley extends through said rectangular-shaped hole, said bolt having a threaded hole at the mid portion thereof for securing the end portion of said bolt.

5. The beverage brewing apparatus of claim 2 and 4 wherein said shaft is prevented from separating from said rectangular-shaped hole by a nut screwed on the outer end portion of said shaft and a stepped nut is disposed on the mid portion of said shaft, said nut and stepped nut being disposed on opposite sides of said frame from each other.

* * * * *